Dec. 12, 1939.   S. JOHNSON, JR   2,183,481
CLUTCH CONTROL MECHANISM
Filed Sept. 17, 1937   2 Sheets-Sheet 1

Inventor
Stephen Johnson Jr.
By N. D. Parker Jr.
Attorney

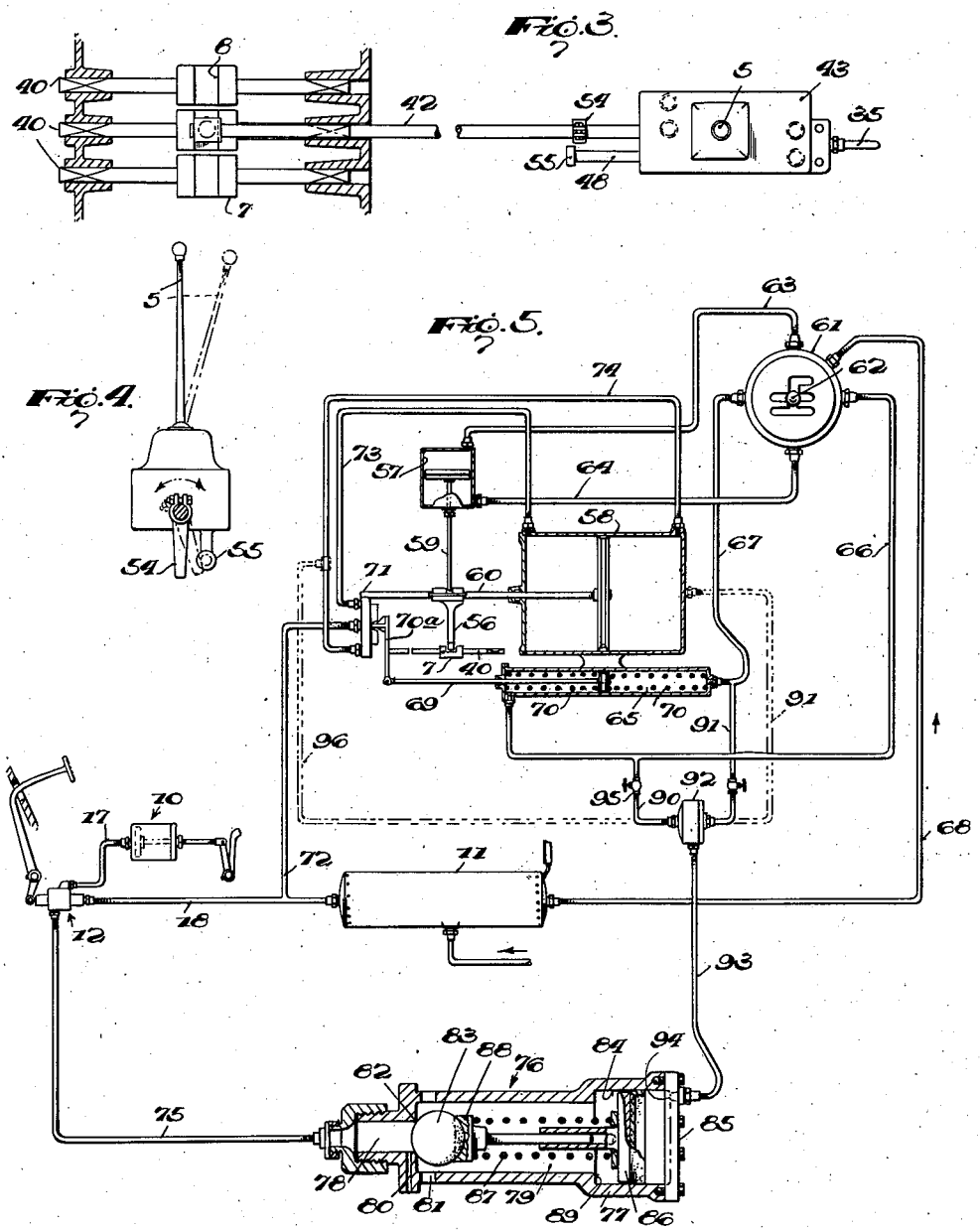

Patented Dec. 12, 1939

2,183,481

UNITED STATES PATENT OFFICE 2,183,481

CLUTCH CONTROL MECHANISM

Stephen Johnson, Jr., Pittsburgh, Pa., assignor to Bendix-Westinghouse Automotive Air Brake Company, Pittsburgh, Pa., a corporation of Delaware Application September 17, 1937, Serial No. 164,397

11 Claims. (Cl. 192—3.5)

This invention relates to controlling systems, and more particularly to systems for controlling the power transmission mechanism of vehicles.

In motor vehicles of the type having a gear set and clutch, it has been found desirable to provide devices for obtaining a relatively slow and smooth engagement of the clutch after establishment of a desired gear ratio without relying on the skill of the operator. Such devices have been more particularly of the type where clutch engagement has been retarded by a dash pot or piston and cylinder arrangement operatively connected to the clutch throw-out mechanism and having, for example, a restricted port connecting the cylinder to atmosphere.

Mechanisms of the above type have been operative, however, with the gear set in both neutral and gear-engaged positions, and have accordingly precluded the use of the well known method of double-clutching by the operator to obtain a smooth shift from one gear ratio to another, it being impossible with such mechanisms to engage and disengage the clutch with sufficient rapidity to accomplish the desired double-clutching action when the gear set is in neutral.

It is accordingly an object of the present invention to provide a control system for permitting double-clutching on vehicles equipped with control devices which act to retard clutch engagement.

A further object is to provide mechanism for rendering the clutch engagement retarding means ineffective when the gear set is in neutral.

Another object is to provide means for rendering the clutch engagement retarding feature effective or ineffective without necessitating the use of any additional controls by the operator.

Still another object of the invention is to provide interconnecting means between a gear set control system and a clutch control system for automatically controlling the action of the clutch engagement retarding mechanism.

Yet another object is to provide fluid pressure means controlled by a gear set control member in connection with a power actuated clutch mechanism for rendering the clutch retarding device ineffective when the control member is in neutral position.

A still further object is to provide means operated by a gear set ratio control member to render the clutch retarding device operative or inoperative, dependent on the gear ratio selected and established by the operation of the control member.

Other novel objects and features of the invention will be more readily apparent from the following detailed description when taken in connection with the accompanying drawings, it being expressly understood, however, that the drawings are for purposes of illustration only and are not designed as a definition of the limits of the invention, reference being had for this purpose to the appended claims.

In the drawings, wherein similar reference characters refer to similar parts throughout the several views:

Fig. 3 is a plan view, partly in section, illustrating a portion of the mechanism shown in Fig. 2;

Fig. 4 is an axial view, partly in section, taken along lines 4—4 of Fig. 2, and Fig. 5 is a diagrammatic view, partly in section, illustrating a modification of the invention in connection with a fluid pressure operated gear set control mechanism.

Figures 1, 2:
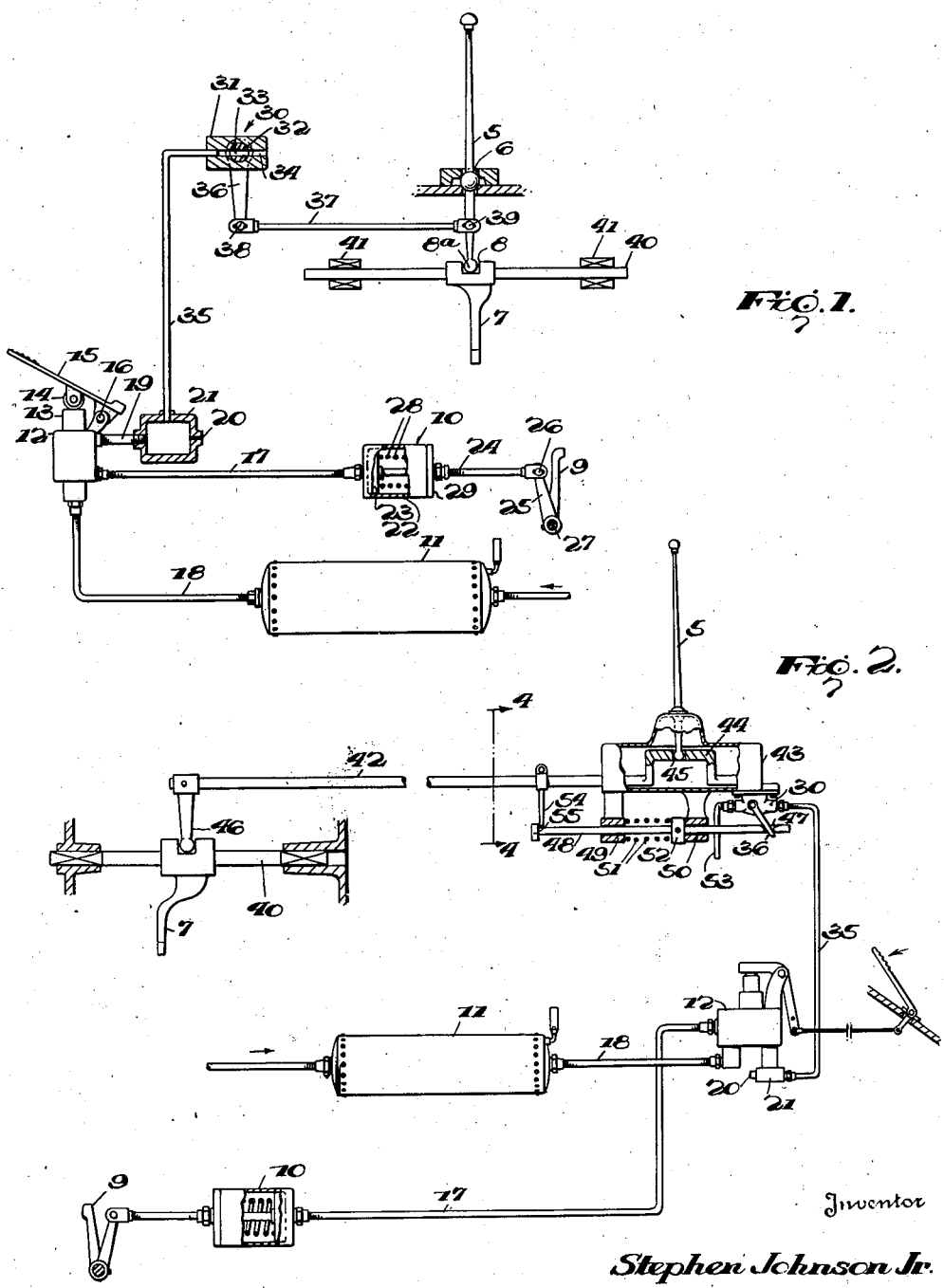
Fig. 1 is a diagrammatic view, partly in section, illustrating an automotive vehicle power transmission control mechanism constructed in accordance with the principles of the present invention.
Fig. 2 is a diagrammatic view, partly in section, illustrating in connection with a power transmission control system a modification of the invention.

Referring more particularly to Fig. 1, a form of the present invention is disclosed therein as being associated with a motor vehicle power transmission control mechanism comprising in general a manually operable gear ratio control member 5, which may be supported for universal movement as by means of a ball and socket joint 6 and adapted to engage at its lower end a gear shifting member 7 through the medium of a transverse slot 8 therein, and a clutch control element 9 adapted to be actuated by a fluid motor 10 associated with a fluid pressure reservoir 11 through a pressure control valve 12 which may be manually operated, thus providing means whereby the operator can easily and efficiently control the shifting of the gears and disengagement and engagement of the clutch, as will be more fully described hereinafter.

The clutch control valve 12 is preferably of the well known self-lapping type and may be constructed in accordance with the principles set forth in the application of William J. Andres, Serial No. 13,008, filed March 25, 1935, which has matured into Patent No. 2,141,678 dated December 27, 1938. As disclosed in the above referred to application, such valves include intake and exhaust valves and a pressure responsive member, the latter being acted on in one direction by an outside force exerted by the operator to cause movement of the member in a corresponding direction sufficient to connect a source of fluid pressure to an actuator by closing the exhaust valve and opening the intake valve, and being acted on in the other direction by the pressure of fluid in the actuator which opposes the outside force and tends to move the pressure responsive member in a reverse direction to allow closure of the intake valve, thus maintaining a pressure in the actuator proportional to the outside force exerted by the operator. A resilient member such as a graduating spring is interposed between the pressure responsive member and a suitable plunger connected to an operator controlled pedal, this spring serving to render the valve self-lapping in a manner well known to those skilled in the art.

In the instant application, the valve 12 of the type described is shown as being provided with a plunger 13 which may be operated in the manner hereinbefore described as by means of a roller 14 carried by a pedal member 15 pivotally mounted on a portion of the valve 12 by means of pivot pin 16 and is operative on downward movement of the pedal member 15 to connect the fluid motor 10 to reservoir 11 by means of conduits 17 and 18. Upward movement of the pedal operates the mechanism of valve 12 to disconnect the fluid motor from reservoir 11 and to connect it to atmosphere through conduit 17, and exhaust passage 19, a suitably restricted exhaust port 20 being formed in one end of a fitting 21, which latter forms a continuation of the exhaust passage 19.

The fluid motor 10 as shown in Fig. 1 may comprise a cylinder 22 having a piston 23 slidably mounted therein and being operatively connected to the clutch control element 9 by means of a piston rod 24 pivotally connected to a lever 25 by a pivot pin 26, the lever 25 having a connection with the element 9 through a rotatable shaft 27. A spring 28 may be interposed between the piston 23 and the end cover 29 of the cylinder for normally maintaining the piston at the left end of the cylinder, the vehicle clutch being engaged when the parts occupy this position. It will thus be apparent from the above that admission of fluid pressure to the motor 10 through conduit 17 will move the piston 23 to the right, compressing spring 28 and causing clutch-disengaging movement of the element 9 in a clockwise direction about shaft 27, while the release of fluid pressure from the motor through conduit 17 and valve 12 will result in clutch-engaging movement of the piston 23 under the action of the compressed spring 28.

From the foregoing description, it will be understood that operation of the clutch control valve pedal 15 downwardly will cause disengagement of the clutch due to the admission of fluid pressure to the motor 10 and the resulting clockwise movement of the clutch control element 9, while release of the pedal will cause a relatively slow clutch-engaging movement of the element 9 in the reverse direction because of the restriction imposed on the exhaust of fluid pressure from the motor 10 by the restricted port 20, the size of this port being so chosen as to result in smooth and efficient engagement of the clutch at a predetermined rate regardless of a quick release of the clutch control valve pedal by the operator.

As has been heretofore stated, however, a slow and smooth engagement of the clutch is neither desirable nor necessary when certain gear ratios, are engaged or when the gears are neutralized, and, in the embodiment of the invention shown in Fig. 1, interconnecting means are provided between the clutch and gear ratio control systems for rendering the restricted exhaust port associated with the clutch control valve ineffective when the gears are neutralized and for rendering it effective when a gear ratio is established, this being accomplished automatically and without necessitating the use of additional controls by the operator. In this embodiment of the invention, such interconnecting means may comprise an auxiliary control valve 30 having a body 31 and a valve member 32 rotatably mounted therein and adapted by means of a relatively unrestricted passage 33 in alignment with a similarly unrestricted passage 34 formed in the valve body, to permit a free passage of fluid pressure through the valve. The left end of the valve passage 34 is connected to the fitting 21 associated with clutch control valve 12 by means of a comparatively large conduit 35 and the right end is open to atmosphere, the valve parts being maintained in the relationship shown by means of a lever 36 operatively connected with the valve member 32 and connected to the gear ratio control member 5 by a rod 37 and pivot pins 38 and 39, the control member 5 being shown in neutral position. It is to be noted that, with the member 5 in the position shown, the exhaust of fluid pressure from the motor 10 is substantially unrestricted and passes freely from the valve 12 to atmosphere through passage 19, fitting 21, conduit 35, and passages 33 and 34 of the valve 30, resulting in a rapid rate of clutch engagement on release of pedal 15 by the operator.

In starting a vehicle equipped with this invention in low gear, the operator, after depressing the pedal 15 to move the element 9 to clutch disengaged position by virtue of the resulting operation of control valve 12 in supplying fluid under pressure to the fluid motor 10 to move the piston 23 to the right, may, for example, move the gear set control lever 5 in a counterclockwise direction to engage a low gear ratio, resulting in gear ratio-engaging movement of the gear shifting member 7 to the right, the latter being guided for longitudinal movement as by means of a rod 40 attached thereto and slidably mounted in guide brackets 41, which may be supported by a gear set casing or cover, not shown. Such movement of the member 7 will result in engagement of low gear in a well known manner, and the parts are so arranged that movement of the control member 5 as described will also move the valve member 32 to a position where the passage 33 of the valve member will no longer register with the passage 34, and the auxiliary valve 30 will thus cut off communication between the exhaust passage 19 of the clutch control valve 12 and the atmosphere and render the port 20 of fitting 21 effective to restrict the exhaust of fluid from the motor 10. The low gear being engaged, the operator has only to remove his foot from pedal 15 to allow the escape of fluid pressure from the motor 10 through the conduit 17, valve 12, passage 19, fitting 21 and restricted port 20 at a predetermined and relatively slow rate to accomplish a smooth engagement of the clutch and a uniform acceleration of the vehicle irrespective of the degree of skill exercised by him in controlling the pedal. As heretofore stated, it is often desirable to double-clutch during a shift from one gear ratio to another, and to accomplish this in the present instance, the operator has only to depress the pedal 15 to disengage the clutch, move the control lever 5 to neutral position, release and again depress the pedal 15 to momentarily engage and disengage the clutch, move the lever 5 in a clockwise direction from the position shown to establish a higher gear ratio, and thereafter release the pedal 5, whereupon the clutch will engage and pick up the load smoothly, since, with lever 5 in the last named position, the valve 30 will again be closed and the restricted exhaust port 20 will effectively retard the release of fluid pressure from the motor 10 to insure engagement of the clutch in the manner described. It will be readily apparent from the foregoing description that, to effect the well known double-clutching operation in a quick and efficient manner, it is necessary that the momentary engagement and disengagement of the clutch when the gears are neutralized occur within a small period of time, and applicant's auxiliary control valve 30 interconnected with the clutch and gear shift controls provides a novel and simple means for attaining this end, and at the same time allows the use of the automatic clutch engagement retarding feature when the gears are in engaged position.

It is sometimes desirable in systems of the above type to have engagement of the clutch automatically retarded only on establishment of one of a plurality of gear ratios, and, with reference more particularly to Fig. 2 of the drawings in conjunction with Figs. 3 and 4, a modified form of the present invention is shown, wherein a plurality of gear shift members or forks 7 having transverse slots 8 are shown as being carried by longitudinally slidable shift rods 40. A rod 42 suitably mounted in a casing 43 for oscillating and longitudinal movement with respect thereto is provided with a crank portion 44 operatively connected with the universally mounted control lever 5 as by means of a bore 45 formed therein and a ball-like portion 8a formed on the lower end of lever 5, the rod 42 having attached to the left end thereof a member 46 adapted to selectively engage the slots 8 of the gear shift forks 7 at its lower end and to move the selected fork to gear-engaged position in response to a corresponding movement of the gear control lever 5. The clutch control system in Fig. 2 is substantially the same as that shown in Fig. 1 hereinbefore described, the control valve 12 having restricted exhaust port 20 associated with exhaust fitting 21 and unrestricted exhaust conduit 35 connecting the fitting with the auxiliary valve 30. The latter valve may be mounted on the housing 43, the valve lever 36 engaging a slot 47 in a rod 48 slidably mounted in bearings 49 and 50 and normally urged to the right as shown by means of a spring 51 abutting bearing 49 and a collar 52 on rod 48, whereby, with the parts in the position shown, valve 30 is in open position and the fitting 21 on valve 12 has an unrestricted connection to atmosphere through conduit 35, valve 30 and an exhaust pipe 53 connected therewith. To engage low gear for instance, the lever 5 as viewed in Fig. 4 may be shifted to the right, rotating the rod 42 and member 46 so that the latter selects the lower shift fork 7 as viewed in Fig. 3, and subsequent movement of lever 5 to the right as viewed in Fig. 2 will move the rod 42 and the selected shift fork 7 to the left to establish the low gear ratio. At the same time, a valve shifting finger 54 attached to the rod 42 is shifted as shown in the dotted lines in Fig. 4 to engage and move valve rod 48 to the left by means of a collar 55 rigidly attached thereto, thus closing the valve 30 when low gear is engaged and providing for a smooth clutch engagement on subsequent release of the clutch pedal by rendering the restricted exhaust port 20 effective in the manner heretofore described. It will be apparent from Fig. 2, however, that, if lever 5 is moved to the left from neutral position, the rod 42, member 46 and shift fork 7 will be moved to the right to engage another gear ratio, but that there will be no corresponding movement of the valve rod 48 to the right, the finger 54 merely moving to the right from collar 55 without imparting movement thereto, and it is further noted with reference to Figs. 3 and 4 that the other shift forks 7 may be selected and moved to gear-engaging position without corresponding operation of the valve 30, the valve being moved to closed position to render the restricted exhaust port 20 effective only when low gear is engaged. Applicant thus has provided novel means for selective engagement and operation of the auxiliary valve 30 for providing automatic control of clutch engagement when starting the vehicle in low gear, the automatic control being ineffective when the gear set is in neutral or when other gear ratios are engaged, to the end that, after the vehicle has been started in low speed, the automatic control mechanism will thereafter be rendered ineffective and the other gear ratios may be readily engaged in an efficient manner by the use of the well known double-clutching method hereinbefore described.

Referring now to Fig. 5 of the drawings, another embodiment of the invention is illustrated wherein applicant's novel clutch control mechanism is used with a fluid pressure operated gear shift control system which may be of the type more fully disclosed in Roger H. Casler et al. application Serial No. 697,193, filed November 8, 1933. Such a system is shown as comprising a member 56 oscillatable to select and longitudinally movable to establish desired gear ratios, and having fluid motors 57 and 58 including suitable pistons and piston rods 59 and 60 in engagement with member 56 for respectively imparting oscillating and longitudinal movement to the member. An operator control unit 61 is provided, having a pair of valves operable selectively in response to movement of the control lever 62 upwardly or downwardly, as viewed in Fig. 5, for controlling the flow of fluid pressure to selector cylinder 57 through conduits 63 or 64, and another pair of valves operable on movement of the control lever to the right or left for controlling the flow of fluid pressure to a double acting relay cylinder 65 by means of conduits 66 or 67, the valves having their intake valves connected to the fluid pressure reservoir 11 by a common conduit 68. The relay cylinder 65 has a piston and piston rod 69 normally held in mid position by springs 70 as shown, and operative by virtue of the rocker arm 70a connected thereto on movement in either direction from this position to actuate a dual control valve 71 carried by the piston rod 60 for connecting reservoir 11 to the motor 58 through a supply conduit 72 leading from the reservoir 11 to the valve and conduits 73 or 74 respectively, depending on whether the relay piston and piston rod is moved toward the left or toward the right from the position shown. The shifting forks 7 and shift rods 40 may be arranged conventionally as shown in Fig. 3 of the drawings, and it will be understood that movements of the control lever 62 in the various slots of the valve unit 61 will cause corresponding movements of the shift forks 7 through their respective connections with fluid motors 57 and 58.

A fluid pressure clutch control system of the type heretofore described is shown for controlling the clutch control element 9 by means of fluid motor 10 and control valve 12, the latter acting to control the flow of fluid pressure from reservoir 11 to the fluid motor through conduits 17 and 18 and having an exhaust conduit 75 for connecting the exhaust port thereof to a fluid pressure controlled auxiliary valve device 76. The latter includes a casing 77 having chambers 78 and 79 connected to atmosphere by restricted and unrestricted ports 80 and 81 respectively, there being a valve seat 82 formed at the right end of chamber 78 adapted to receive a ball valve 83. A bore 84 in casing 77 is closed at the right end by a cover 85 and has a piston 86 slidably mounted therein for forcing the ball valve 83 against its seat through the medium of a spring 87 and a guide member 88, the spring being interposed between the piston and guide member as shown. The spring is normally free from compression with the parts in the position shown so that the slightest pressure in chamber 78 will be sufficient to move the valve from its seat and allow fluid to enter chamber 79 and exhaust freely through the relatively large ports 81. The admission of fluid under pressure to the right side of the piston 86, however, will move the piston to the left until it abuts a shoulder 89 formed in the casing, compressing the spring 87 to a degree predetermined by the dimensions of the spring and the position of the shoulder in the casing, thus holding the ball valve against the seat 82 with a force corresponding to the degree of spring compression for preventing the passage of fluid from chamber 78 to chamber 79 and causing fluid under pressure in chamber 78 to escape through the restricted exhaust port 80. It will thus be seen that auxiliary valve means operable by fluid pressure are provided for permitting either an unrestricted exhaust of fluid from the clutch motor or a restricted exhaust of fluid therefrom, dependent on the actuation of the valve 83 by the piston 86.

In the embodiment of the invention shown in Fig. 5 and described above, fluid under pressure is conveyed from the control valve unit 61 to the piston 86 through conduits 66 and 90 or 67 and 91, a double check valve 92 of well known design, conduit 93 and port 94 in cover plate 85. Conduits 90 and 91 are provided with adjustable valves 95 for controlling the rate of flow of fluid under pressure to and from the auxiliary valve device 76 in order that operation of the auxiliary valve 76 may be properly synchronized with that of the gear shift control system. It is therefore apparent that, if the control lever 62 is moved to operate the control valves of unit 61 and supply fluid under pressure to the relay cylinder for actuating the motor 58 through the operation of dual valve 71 to establish a given gear ratio, conduits 66 or 67 will be energized, dependent on whether the control lever is moved to the right or to the left as viewed in Fig. 5, with a resulting energization of conduit 93 and movement of piston 86 to the left to close the valve 83. Since pressure must be maintained in the relay cylinder 65 to hold the gears in engaged position, it follows that the conduit 93 will be energized whenever a gear ratio is engaged, thus rendering the port 80 effective to restrict the exhaust of fluid pressure from the clutch motor 10 for the purpose of providing a smooth and automatically controlled engagement of the vehicle clutch, while operation of control lever 62 to neutral position will cause the valves of control valve unit 61 to exhaust fluid pressure from the relay cylinder 65 as well as from the auxiliary valve device 76 by way of port 94, conduit 93, double check valve 92, and conduits 90 and 66 or 91 and 67, thus removing the force of spring 87 from ball valve 83 and rendering the large exhaust ports 81 of valve device 76 effective to exhaust fluid pressure from the clutch motor 10 through the control valve 12 at a rapid rate on release of the latter by the operator and permit the desirable double-clutching action heretofore described when the gears are in neutral position. The valve device 76 may also be actuated by fluid pressure from the dual valve 71, in which case the conduits 96 and 97 shown in dotted lines and respectively connecting the left side of double check valve 92 with conduit 73 and the right side with the right end of cylinder 58 may replace conduits 90 and 91 without materially changing the mode of operation of the invention.

While several embodiments of the invention have been shown and described with some particularity, it is to be expressly understood that the scope of applicant's invention is not to be limited thereby, except as defined by the appended claims.

What is claimed is:

1. In a control mechanism for vehicles having a gear set and clutch, fluid pressure operated control means for the gear set, a fluid motor for actuating the clutch, valvular means including a restricted exhaust port and a relatively unrestricted exhaust port for controlling the flow of fluid pressure from said motor, and means controlled by the pressure of the fluid in said first named means for rendering said unrestricted exhaust port effective when the gear set is in neutral.

2. In a control system for power transmission mechanism having a gear set and clutch, fluid pressure operated control means for said gear set, a fluid actuator for said clutch, valvular means including a fixed restricted port for releasing fluid from said actuator at a predetermined rate, and means including a connection with said valvular means and controlled by the pressure of the fluid in said first named control means for actuating the valvular means for releasing fluid from said actuator at a rate greater than said predetermined rate when the gear set is in neutral.

3. In a control mechanism for vehicles having a gear set and clutch, fluid pressure operated control means for the gear set, a fluid pressure actuator for the clutch, means including a restricted port and a relatively unrestricted port for controlling the release of fluid from said actuator during clutch-engaging movement thereof, and fluid pressure operated means controlled by the pressure of the fluid in said first named means for rendering said unrestricted port ineffective when the gear set is in neutral.

4. In combination with a gear set and clutch, fluid pressure operated gear set control means for controlling establishment of a desired gear relation, a clutch control element, means including a power actuator for controlling and effecting clutch-disengaging and engaging movements of said element, means for retarding clutch-engaging movements of said element at a predetermined rate independent of the position thereof, and fluid pressure operated means controlled by the pressure of the fluid in said first named means for rendering said retarding means ineffective when a neutral gear relation is established.

5. In a control system for vehicles having a gear set and clutch, fluid pressure control means for said gear set, a clutch control element, means for controlling and effecting clutch-disengaging and engaging movements of said element, and means associated with said second named means for limiting the rate of clutch-engaging movement of said element in a predetermined manner independent of the position thereof, said means being controlled by the pressure of the fluid in said first named means for effecting an increase in the rate of clutch-engaging movement of said element when the gear set is in neutral.

6. In a control mechanism for a gear set and clutch, a source of fluid pressure, a fluid pressure system including an actuator for controlling the gear set, a fluid motor for operating the clutch, valvular means for controlling the flow of fluid pressure to and from said motor, and valvular means responsive to the pressure of fluid in said system for restricting the flow of fluid pressure from said motor through said valvular means.

7. In a control mechanism for a gear set and clutch, a source of fluid pressure, a fluid pressure system for selecting and establishing a desired gear relation, a clutch control element, a fluid motor for actuating said element, valvular means for controlling the flow of fluid pressure to and from said motor, and separate valvular means responsive to the pressure in said system for varying the rate of flow of fluid pressure from said motor.

8. In a system for automatically controlling the rate of engagement of a clutch associated with a gear set, a source of fluid pressure, a clutch control element, a fluid motor for actuating said element, valvular means having a restricted port for exhausting fluid pressure from said motor at a predetermined rate, a fluid pressure operated gear set movable to effect engagement and disengagement of desired gear ratios, and means associated with said valvular means and operable in response to fluid pressure during movement of said gear set to gear ratio-disengaging position for controlling said valvular means for exhausting fluid pressure from said motor at a rate greater than the predetermined rate, whereby the rate of clutch engagement is substantially increased on disengagement of a desired gear ratio.

9. In a power transmission mechanism having a gear set and clutch, a member shiftable to establish either of a pair of gear shift ratios, fluid pressure means for controlling the movement of said member, a clutch controlling element, a source of fluid pressure, a fluid motor for actuating said element, valvular means for controlling the flow of fluid pressure to and from said motor for effecting clutch-disengaging and engaging movements of said element, and means responsive to fluid pressure in said first named means for retarding the release of fluid pressure from said motor.

10. In a control system for power transmission mechanism having a gear set and clutch, a shiftable member for said gear set having neutral and gear ratio-establishing positions, fluid pressure control means for said member, clutch actuating and controlling mechanism, and means for retarding actuation of the clutch by said mechanism responsive to fluid pressure in said control means during movement of said shiftable member to neutral position for rendering said retarding means ineffective.

11. In combination with a gear set and a clutch, fluid pressure operated means for controlling establishment of a desired gear relation, a clutch control element, means including a power actuator for controlling clutch-disengaging and engaging movements of said element, and means for retarding clutch-engaging movements of said element at a predetermined rate and controlled by the pressure in said first named means for changing said predetermined rate.

STEPHEN JOHNSON, Jr.